United States Patent
Adams

(10) Patent No.: US 6,890,003 B2
(45) Date of Patent: May 10, 2005

(54) SUSPENSION SUBFRAME ASSEMBLY

(75) Inventor: James H. Adams, Tallmadge, OH (US)

(73) Assignee: East Manufacturing Corporation, Randolph, OH (US)

( * ) Notice: Subject to any disclaimer, the term of this patent is extended or adjusted under 35 U.S.C. 154(b) by 0 days.

(21) Appl. No.: 10/194,934

(22) Filed: Jul. 12, 2002

(65) Prior Publication Data

US 2004/0007864 A1 Jan. 15, 2004

(51) Int. Cl.$^7$ ................................................. B60G 9/02
(52) U.S. Cl. ............................... 280/789; 280/124.116; 280/124.125
(58) Field of Search .................. 280/789, 124.116, 280/124.125, 124.118, 724.116, 86.5

(56) References Cited

U.S. PATENT DOCUMENTS

| | | | |
|---|---|---|---|
| 4,162,090 A | * 7/1979 | Schwartz | 280/124.116 |
| 4,718,692 A | * 1/1988 | Raidel | 280/124.116 |
| 5,171,036 A | * 12/1992 | Ross | 280/124.116 |
| 5,337,997 A | * 8/1994 | Hockney | 248/596 |
| 5,354,165 A | 10/1994 | Booher | |
| 5,366,237 A | * 11/1994 | Dilling et al. | 280/124.116 |
| 5,375,871 A | * 12/1994 | Mitchell et al. | 280/124.116 |
| 5,482,356 A | 1/1996 | Goodson, Jr. | |
| 5,509,724 A | 4/1996 | Perry et al. | |
| 5,655,788 A | * 8/1997 | Peaker | 280/86.5 |
| 5,758,927 A | 6/1998 | Koester | |
| 5,782,538 A | 7/1998 | Backs | |
| 6,213,507 B1 | * 4/2001 | Ramsey et al. | 280/788 |
| 6,425,593 B2 | 7/2002 | Fabris et al. | |
| 6,428,026 B1 | * 8/2002 | Smith | 280/124.125 |
| 6,471,223 B1 | * 10/2002 | Richardson | 280/86.5 |
| 6,491,314 B2 | * 12/2002 | Smith et al. | 280/124.116 |
| 6,508,393 B2 | * 1/2003 | Chalin | 228/136 |
| 6,604,734 B1 | * 8/2003 | Griffiths | 267/64.14 |
| 2001/0030406 A1 | * 10/2001 | Pierce | 280/124.116 |

FOREIGN PATENT DOCUMENTS

EP          0 773 119 A1      5/1997

* cited by examiner

Primary Examiner—Teri Pham Luu
Assistant Examiner—Bret Hayes
(74) Attorney, Agent, or Firm—Fay, Sharpe, Fagan, Minnich & McKee, LLP

(57) ABSTRACT

A lightweight, high strength, one-piece subframe and suspension for a trailer that cuts down on the weight of the trailer without diminishing the strength as compared to conventional trailers, and that is compatible with a conventional air ride suspension system. The invention comprises at least two beams positioned generally parallel to each other; a plurality of ribs attached to the at least two beams and positioned extending transverse between and generally perpendicular to the at least two beams; at least one hanger attached to each beam; and wherein the trailer suspension subframe is made of aluminum.

2 Claims, 10 Drawing Sheets

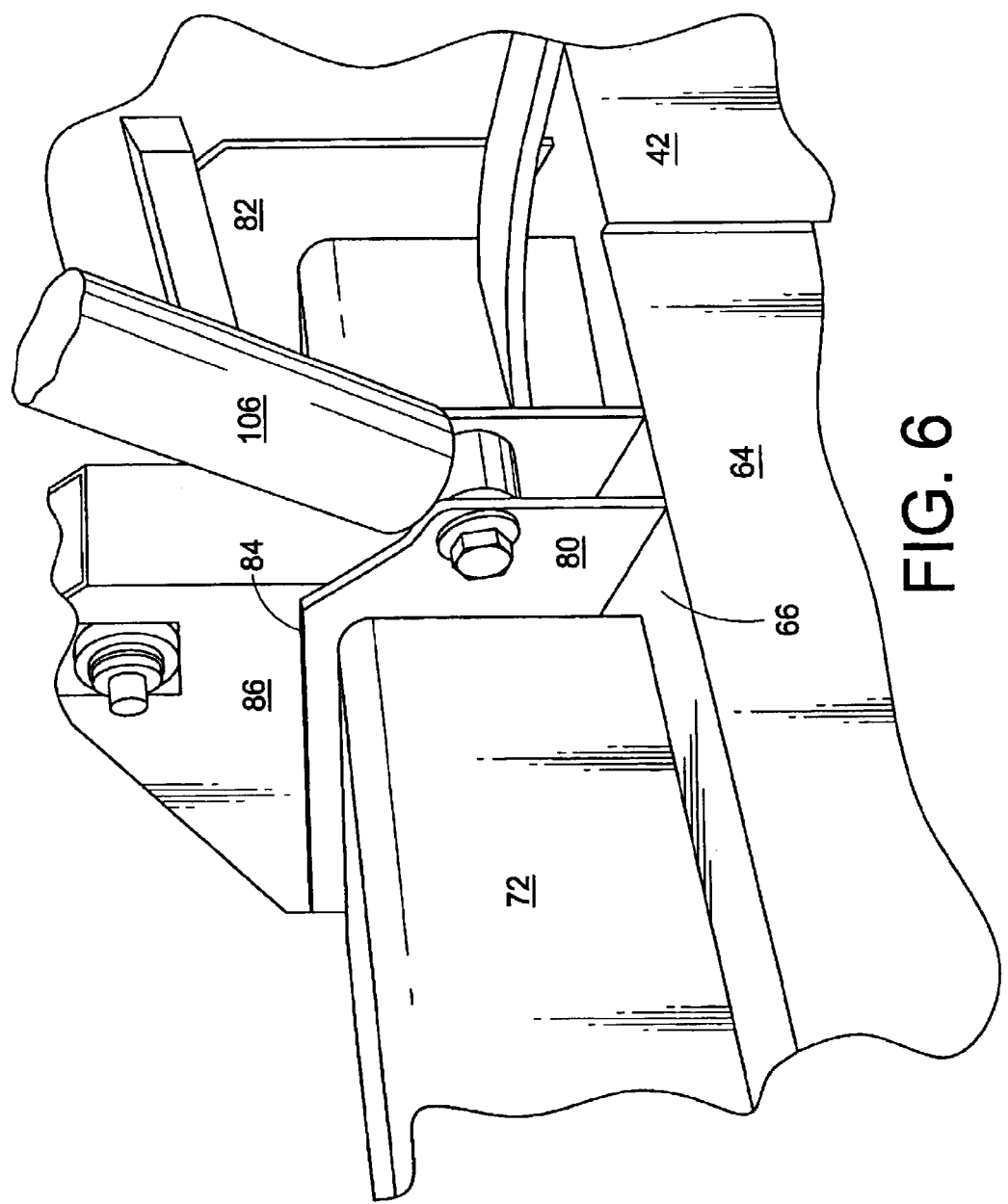

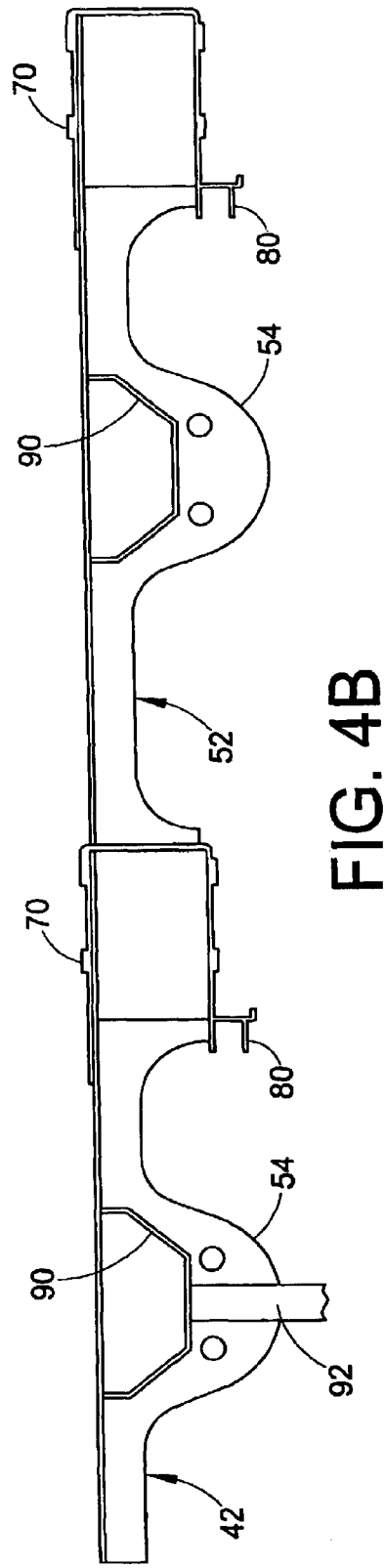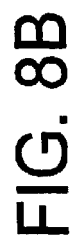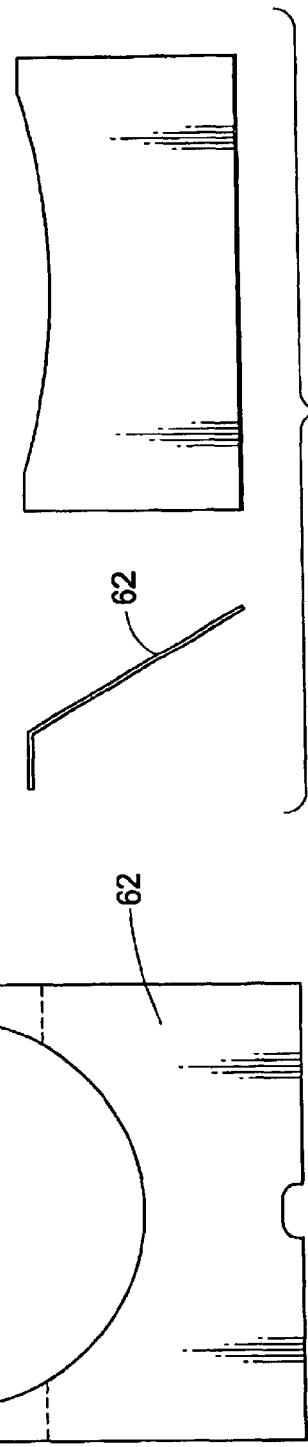
FIG. 4B
FIG. 8A
FIG. 8B

SUSPENSION SUBFRAME ASSEMBLY

TECHNICAL FIELD

The present invention relates generally to a suspension subframe assembly for trailers. More particularly, this invention relates to a lightweight, high-strength, integrated, aluminum suspension subframe for trailers which allows for connection of a conventional suspension arm, air spring, and shock absorber.

BACKGROUND OF THE ART

A wide variety of trailers have been developed for transportation of various goods via roadways. Such trailers include platform trailers, refuse trailers, dump trailers as well as other types. Further, within these types of trailers, various configurations may be available, such as frame and frameless dump trailers, which are suitable for alternative applications. In the various trailers configurations, suspension systems are provided in association with wheels of the trailer to provide a smoother ride and facilitate handling and transportation of loads thereby. As it is desired to maximize the load carrying capacity of the trailer, the characteristics of the suspension system and mounting arrangement become an important aspect of the trailer design.

Prior trailers typically use a steel suspension system which includes the steel hangers, steel brackets, suspension arm, air spring, and shock absorbers. The suspension arm is attached to the axle and the air spring; steel hangers, and steel brackets are generally attached directly to one or more central I-beams or a sub-frame foundation over the rear wheels of the frameless trailer. For various applications, it may also be necessary to bolster the structural strength of components to handle expected loads. For example, the rear of the frameless dump trailer may require heavier duty structural components such as the steel suspension and steel subframe.

In the past, trailers had been manufactured using plates of aluminum sheet welded together and reinforced with reinforcing ribs. Now, some trailers are being manufactured using high strength extruded aluminum plate such as 6061. The extruded aluminum provides great advantages in terms of strength while eliminating much of the need for reinforcing ribs along the trailer body. However, the strength and durability required for many of the subframe and suspension components have substantially prevented the use of aluminum on a suspension subframe assembly. Accordingly, these material advantages have not been utilized in the structural components such as the steel suspension and steel subframe.

It would therefore be desirable to provide a suspension subframe assembly which has the desired strength characteristics, while being of reduced weight, and which allows for various suspension systems to be integrated into the trailer construction in a simplified manner. It would also be desirable to provide a suspension subframe assembly which has and integrated hanger for mounting of suspension system components.

SUMMARY OF THE PRESENT INVENTION

It is therefore an object of the present invention to provide a lightweight, high strength, one-piece subframe and suspension for a trailer that significantly reduces the weight of the trailer without diminishing the strength as compared to conventional trailers, such as frameless dump trailers. The invention also provides a one-piece subframe and suspension system that is compatible with conventional air ride suspension systems for example. These and other advantages are provided by a trailer suspension subframe comprising at least two beams positioned generally parallel to each other; a plurality of ribs attached to the at least two beams and positioned extending transverse between and generally perpendicular to the at least two beams; at least one hanger associated with each beam; and wherein the trailer suspension subframe is made of aluminum.

The invention is also directed to a method for making an aluminum suspension subframe for a trailer comprising the steps of (1) providing at least two aluminum beams; (2) bending a portion of each beam such that each beam comprises a web portion and a flange portion generally formed perpendicular to each web portion; (3) positioning the web portion of each beam generally parallel to each other, (4) welding a plurality of aluminum ribs to the at least two beams such that the ribs are positioned extending transverse between and generally perpendicular to the at least two beams; (5) providing a generally U shaped aluminum channel having a central portion and a pair of leg portions extending from the central portion; (6) welding each leg portion of the U shaped channel to adjacent ribs of the plurality of ribs; (7) welding the U shaped channel to the at least two beams; (8) providing a plurality of extruded aluminum hangers; and (9) welding at least one of the plurality of hangers to each beam and to the U shaped channel.

BRIEF DESCRIPTION OF THE DRAWINGS

A better understanding of the present invention will be had when reference is made to the accompanying drawings, wherein identical parts are identified with identical reference numerals, and wherein:

FIG. 4B is a bottom elevational view of the longitudinal beam of the suspension subframe showing attachment of the air spring reinforcement and hangers;

FIG. 6 is a perspective view of the shock bracket portion of the hanger and of the attachment of the hanger to the remainder of the suspension subframe;

FIG. 8A is a side elevational view of a front skirt prior to bending formation of the bottom; FIG. 8B is an end view of the formed longitudinal beam;

DETAILED DESCRIPTION OF THE DRAWINGS

Figure 1:
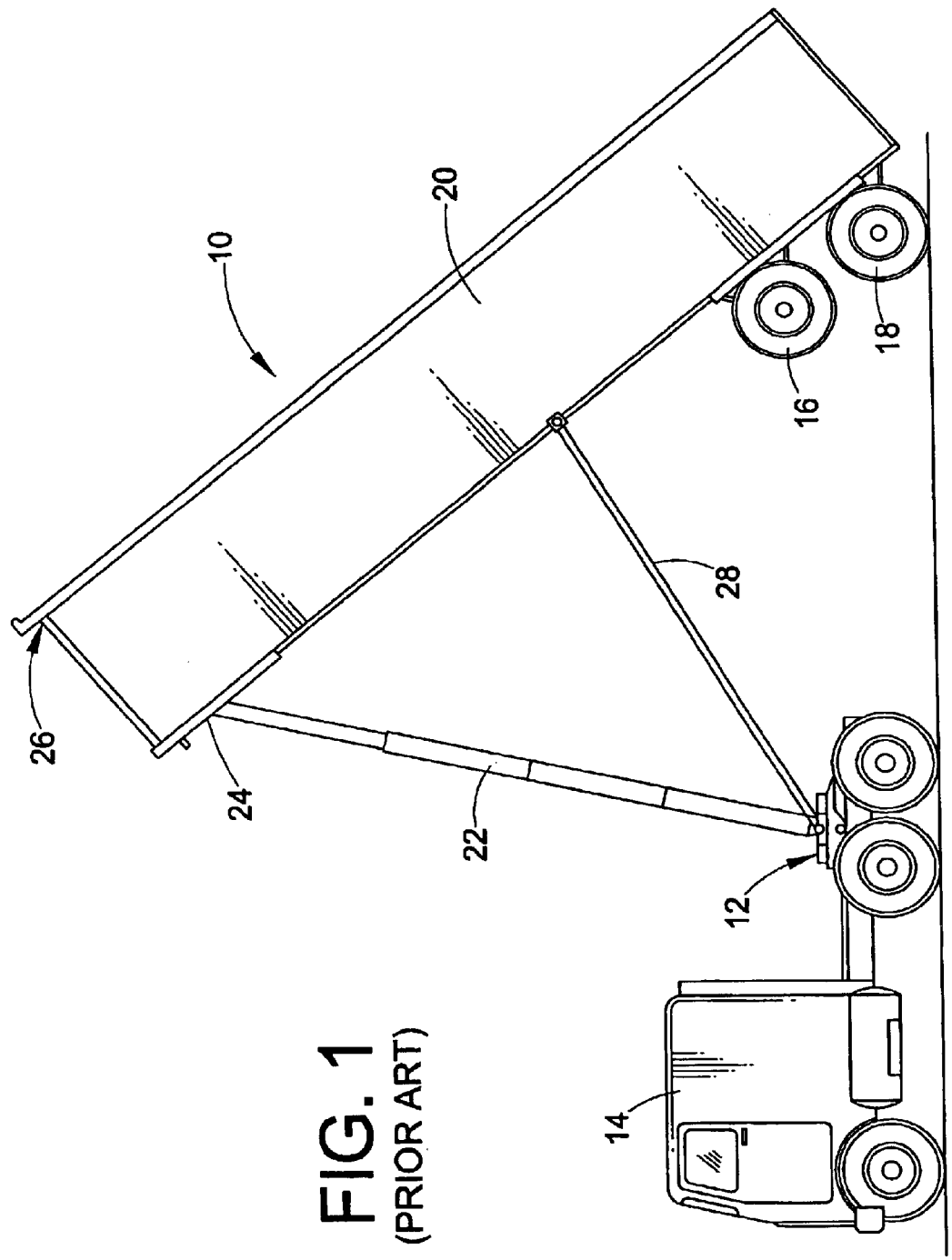
FIG. 1 is a side view in elevation of a prior art trailer, being a frameless dump trailer in the raised position.

FIG. 1 shows a prior art trailer 10, which as an example is a frameless dump trailer, having a hitch assembly 12 coupled to a tractor 14 shown in phantom. Trailer 10 is shown with load compartment 20 in the tilted dumping position. As the load compartment 20 is raised, lead wheels 16 elevate off of the ground as the load compartment 20 pivots on trailing wheels 18. Load compartment 20 is elevated by a telescoping hydraulic cylinder 22 attached at one end to the hitch assembly 12 and attached at the opposite end to the load compartment 20 through a reinforced area commonly referred to as the dog house 24 to a hoist housing (not shown) formed in the load compartment 20. The leading end of the load compartment 14 comprises a bulkhead 26 which provides additional strength to the hoist area. Additional support is provided by draft arms 28 connected at one end to the hitch assembly 12 and attached at the opposite end to the bottom of the load compartment 20 generally near the midpoint of the load compartment 20. The draft arms 28 typically include a dolly (not shown) for support of the front of the trailer 10 when the trailer 10 is not hitched to a tractor 14. This as well as other trailer types are provided with a suspension system in association with the rear wheels of the trailer 10, to which the present invention is directed.

Figure 2:
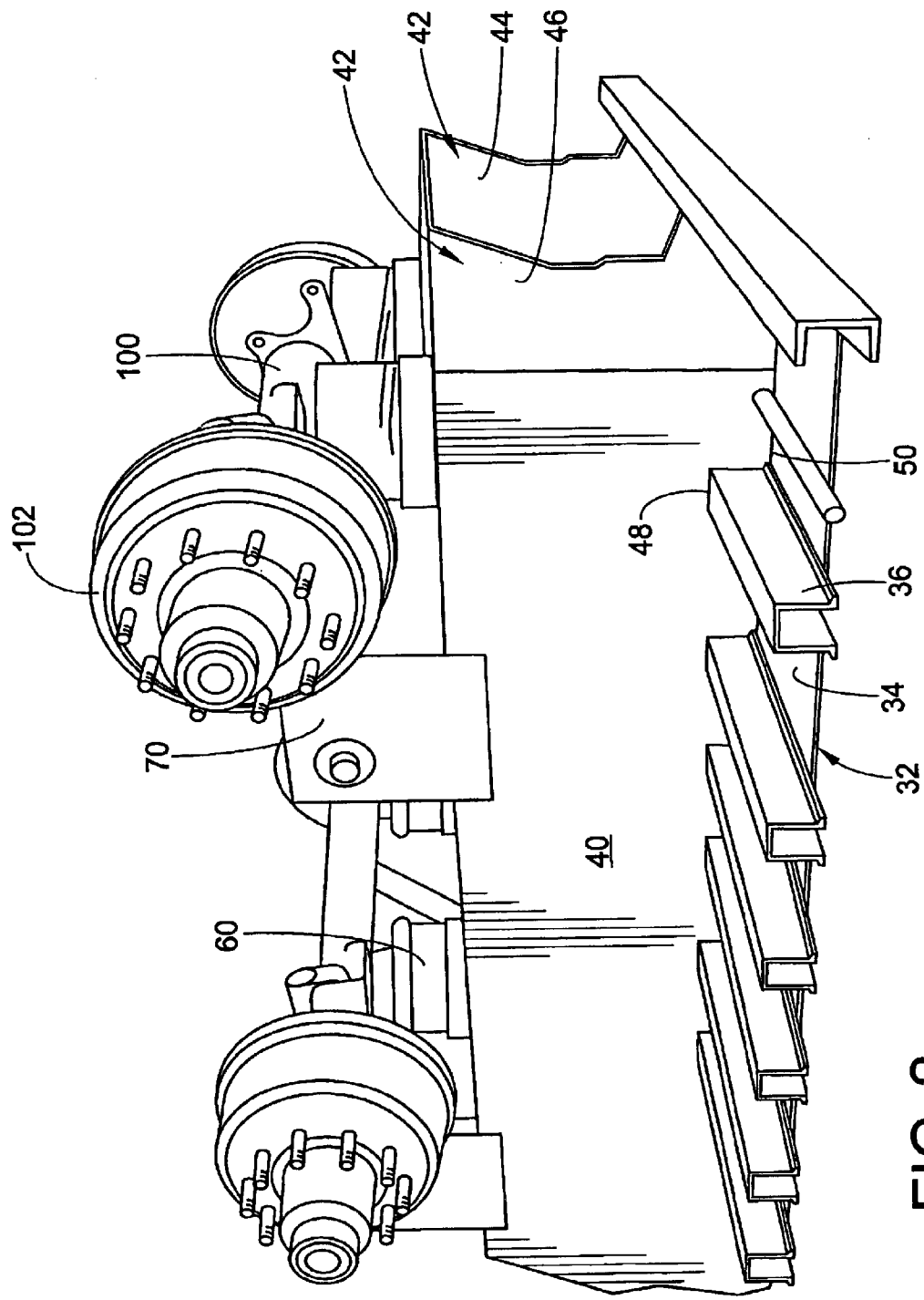
FIG. 2 is a perspective view of the suspension subframe of the present invention shown attached to the floor of a trailer.
Figure 3C:
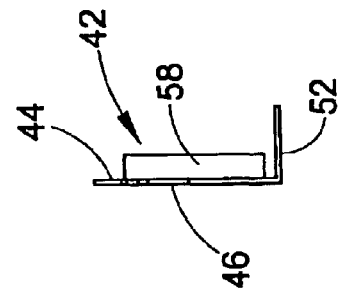
FIG. 3C is an end view of the formed longitudinal beam.
Figure 3A:
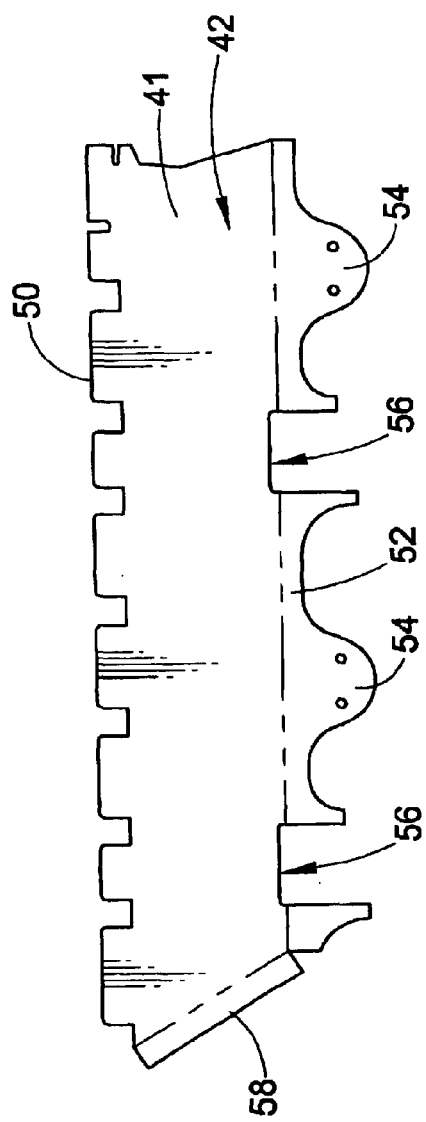
FIG. 3A is a side elevational view of longitudinal beam prior to bending formation of the front side and bottom.
Figure 3B:
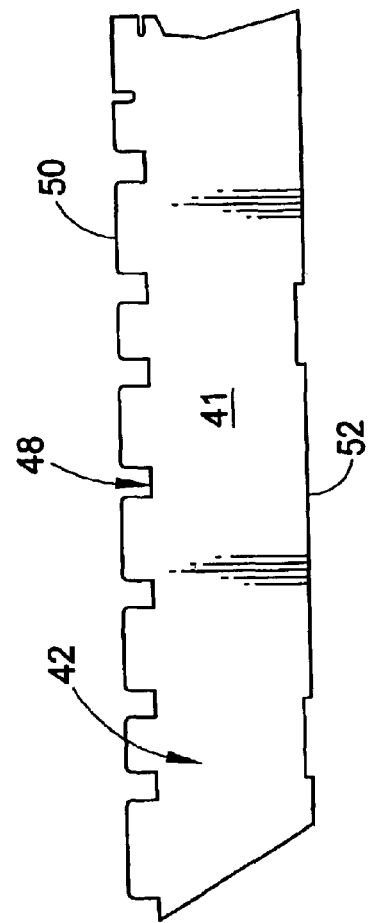
FIG. 3B is a side elevational view of the longitudinal beam after bending formation of the front side and bottom.

Referring now to FIG. 2, the suspension subframe assembly 40 of the present invention is shown in an inverted position and having an axle assembly 100, wheels 102, and air springs 60 attached thereto. The suspension subframe assembly 40 is welded directly to the bottom of the floor 32 of the trailer 10. The floor 32 of the trailer 10 may comprise flat sheets 34 of aluminum which are welded to each other. The floor 32 may be reinforced with cross-members 36 typically extruded aluminum U-channel beams extending from one side of the floor to the other and perpendicular to the longitudinal centerline of the trailer 10. Full box beams (not shown) are generally used underneath adjacent floor sheets 34 to help reinforce the welded seam between floor plates 34. The suspension subframe assembly 40 comprises a pair of longitudinal beams 42 which provide longitudinal support for the trailer floor. Longitudinal beams 42 have an interior side 44 facing inward and an exterior side 46 facing outward from the trailer 10. The longitudinal beam 44 is formed from a sheet of aluminum having a plurality of slots 48 formed along a top end 50 thereof to enable the beam 42 to be attached to the floor 32 and the transverse cross-members 36. As best shown in detail views FIGS. 3A–3C, the longitudinal beam 42 comprises a web portion 41 and a flange portion 52 formed generally perpendicular to the web portion 41. The bottom end or flange 52 of the longitudinal beam 42 is bent generally at about a 90 degree angle inward and is formed to provide an attachment area 54 and support for at least one air spring 60 and a clearance area 56 for the attachment of at least one hanger 70. A first side 58 of the beam 42 is also bent generally at a 90 degree angle to provide attachment to a front skirt 62 which is discussed further below.

Figure 4A:
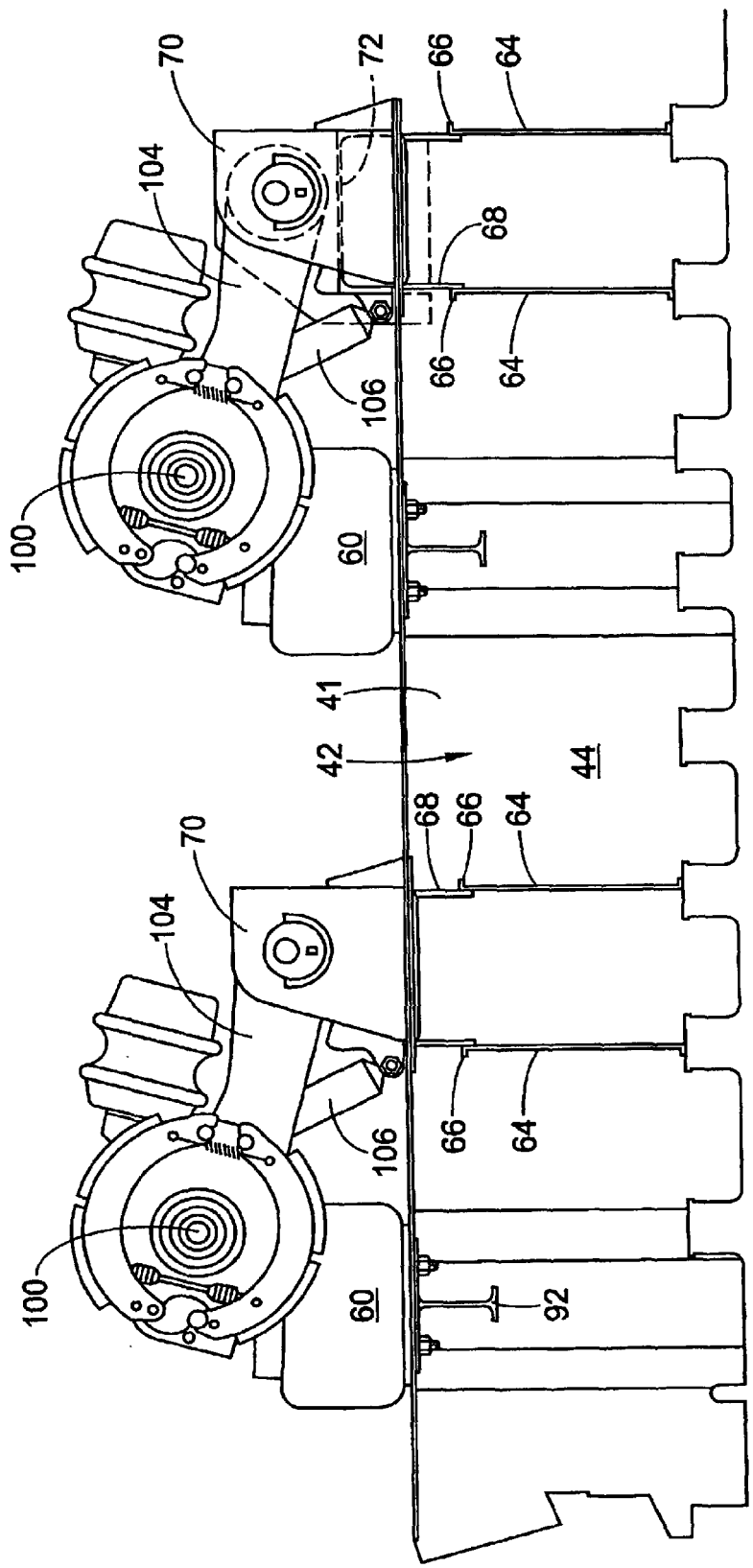
FIG. 4A is a cross-sectional view of the longitudinal beam of the suspension subframe showing the ribs attached to the cross-members of the floor of the trailer.
Figure 5A:
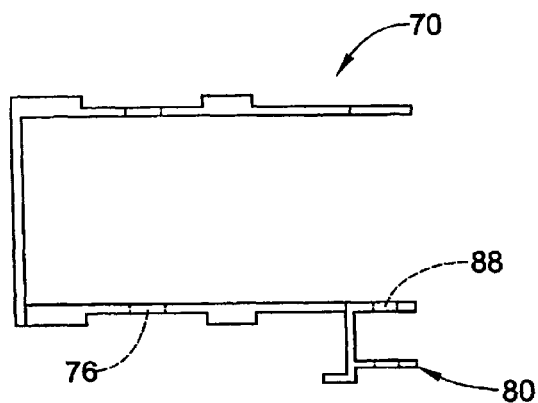
FIG. 5A is a top view of the hanger of the suspension subframe.
Figure 5B:
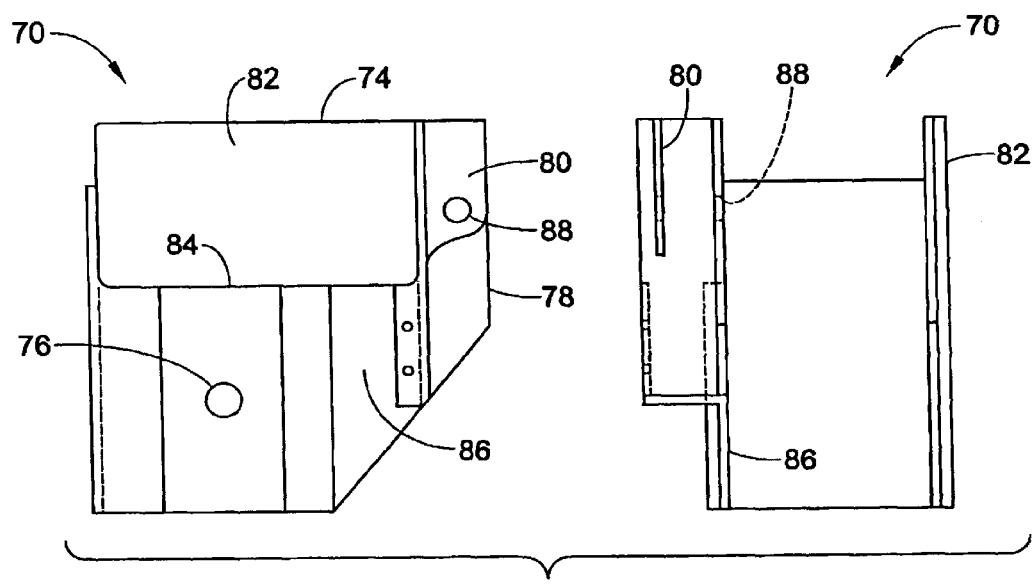
FIG. 5B is an interior side elevational view of the hanger.

Referring now to FIG. 4A, an interior elevational side view of the suspension subframe assembly 40 is shown with an attached air spring 60, axle assembly 100, swing arm 104, and shock absorber 106. And associated top elevational view of the flange 52 of the longitudinal beam 42 and associated attached components is shown in FIG. 4B. The longitudinal beams 42 are also supported by a plurality of ribs 64 formed by aluminum sheets oriented transverse and generally perpendicularly attached to the longitudinal beams 42 as best shown in FIG. 4A. Each end 66 of the ribs is formed generally at a 90 degree angle from the base of the rib 64 to provide an area for welding attachment. At the location of each hanger 70, adjacent ribs 64 are attached to and provide support for the legs 68 of a channel or U-shaped beam 72. The U-shaped beam 72 extends transversely between and is attached to the longitudinal beams 42, and provides support and an attachment for the hangers 70. The hangers 70 are attached directly to the U-shaped beam 72 and the longitudinal beams 42. The hangers 70 are formed as an extrusion having a cross-section as shown in FIG. 5A to provide optimum strength and minimal weight. A pair of apertures 76 are formed through the hangers 70 for attachment of the swing arm. The top portion 74 of the exterior side 82 of hanger 70 attaches to the longitudinal beam 42 and the exterior side 82 provides an attachment area for the U-shaped beam 72 as best shown in FIG. 5B. The top portion 84 of the interior side 86 of hanger 70 provides a clearance and attachment for the U-shaped beam 72. A first end 78 of hanger 70 comprises a shock absorber attachment bracket 80 having apertures 88 formed integral to the hanger 70 and welded to the U-shaped beam 72 as best shown in FIG. 6. FIG. 6 also shows attachment of the U-shaped beam 72 to the top portion 84 of the interior side 86 of hanger 70 as well as to the exterior side 82 of hanger 70.

Figure 10:
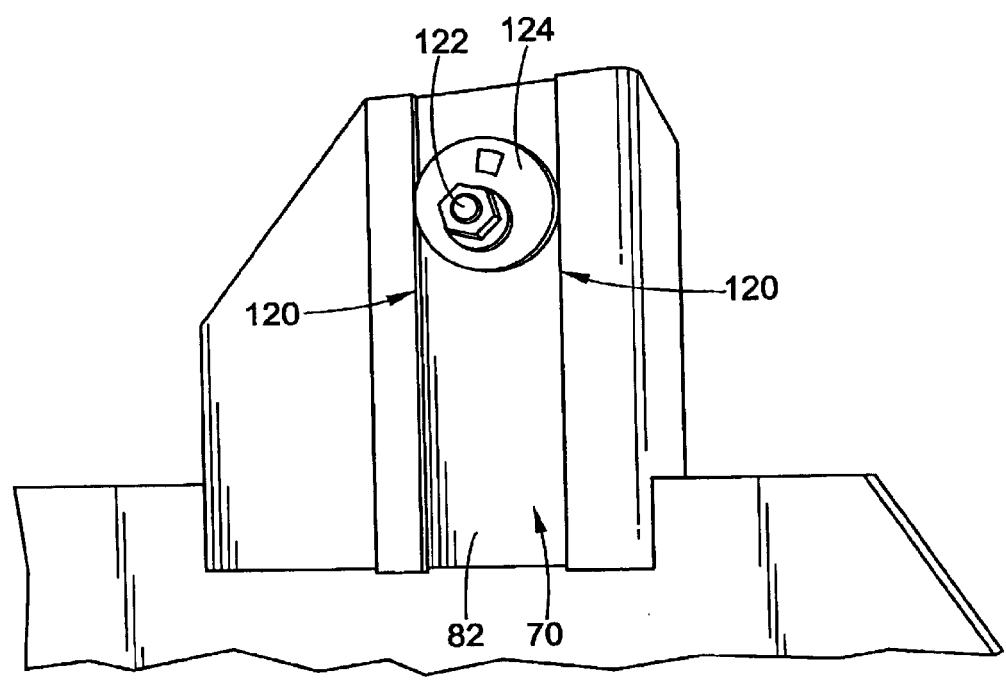
FIG. 10 is a detail view of the hanger shown in FIG. 10.

Referring now to FIG. 10, a detail view of the hanger 70 of FIG. 2 is shown. As previously shown in FIGS. 5A and 5B, the exterior side 82 and interior side 86 of the hanger 70 have a change in cross-sectional thickness 120. As previously revealed in FIG. 2 and shown in close up in FIG. 10, the swing arm attachment is shown having a bolt 122 eccentrically positioned through a circular member 124. The swing arm attachment shown is well known in the art and provides adjustment of the swing arm attachment position. With the hanger 70 of the present invention, the circular member 124 engages the change in cross-sectional thickness 120 which acts as a conventional swing arm attachment alignment guide. As the change in cross-sectional thickness 120 is integral to the hanger 70, no additional welding of conventional alignment guides to the hanger is needed.

Figure 7:
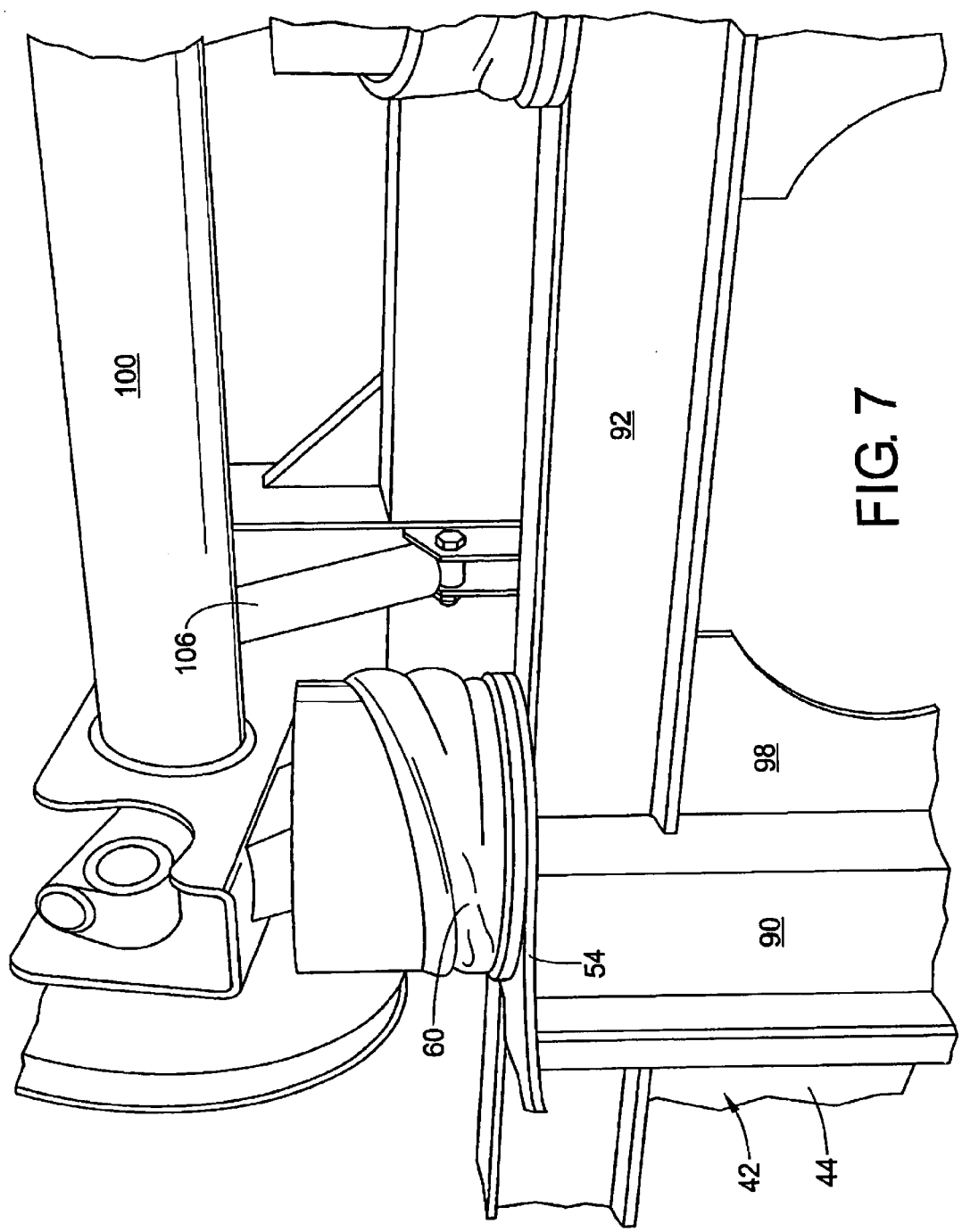
FIG. 7 is a perspective view of the attachment of the air spring to the longitudinal beam of the suspension subframe.

Referring now to FIG. 7 and FIGS. 4A and 4B, the air spring is attached and air spring support portion 54 of the longitudinal beam 42. The air spring support portion 54 is supported by a reinforcement channel 90 extending from the bottom of the trailer floor 32 to the top of the air spring support portion 54 and attached to the interior side 44 of the longitudinal beam 42. The air spring support portion 54 of the longitudinal beam 42 is also supported by an I beam 92 extending transverse and generally perpendicular to the longitudinal beams 42 and attached at either end to the reinforcement channel 90. As shown in FIG. 7, I beam 92 is further supported by at least a portion of a rib 98 attached at one end to the reinforcement channel 90 and extending transverse and generally perpendicular to the floor of the trailer and the top of the I-beam 92.

Figure 9A:
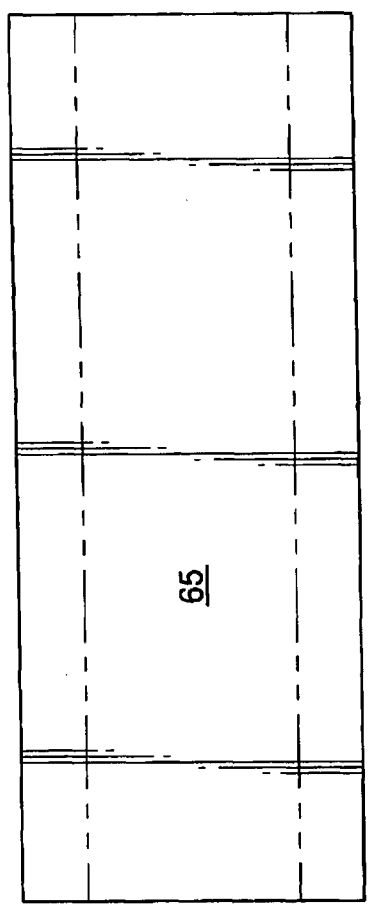
FIG. 9A is a side elevational view of a rear skirt prior to bending formation.
Figure 9B:
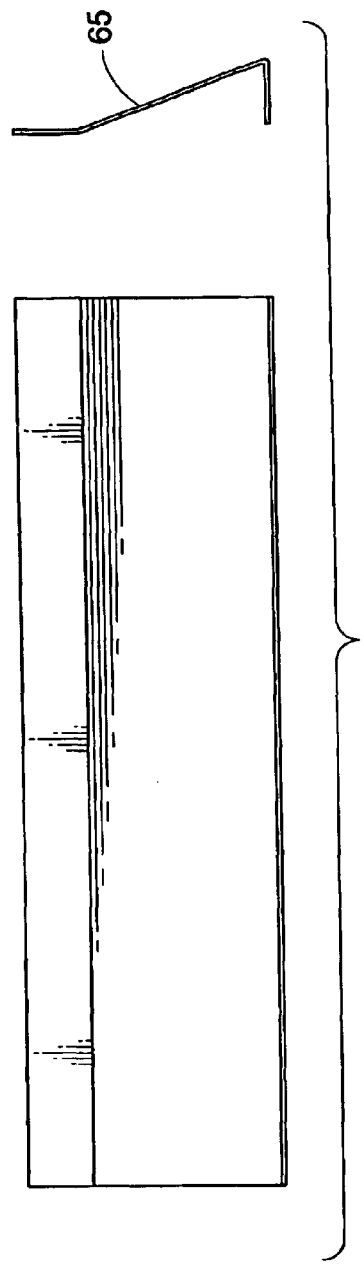
FIG. 9B is an end view of the formed end skirt.

Referring now to FIGS. 8A and 8B, the front skirt 62 is shown an unformed condition and in and an end view in a formed condition. The front skirt 62 attaches to the bent front portion 58 of longitudinal beam 42. The front skirt 62 helps protect the interior of the suspension subframe assembly 40 as well as provides additional support for the longitudinal beams 42. Similarly, referring now to FIGS. 9A and 9B, the rear skirt 65 is shown in an unformed condition and in an end view in a formed condition. The rear skirt 65 attaches to the flange 52 and the web 41 of longitudinal beams 42. The rear skirt 65 helps protect the interior of the suspension subframe assembly 40 and provides additional support for the longitudinal beams 42.

The present invention takes advantage of new developments aluminum material technology to utilize a lower weight high strength aluminum product to replace steel structural elements typically used in prior art trailers. Examples of the preferred types of aluminum alloys include 6061T6 and 6005T5. The higher strength aluminum enables the weight savings of approximately 400 pounds in one trailer configuration, as compared to a conventional steel subframe and steel suspension. The invention may be used with different trailer types, and on trailers constructed of different materials, such as aluminum or composite. The present invention also provides a unique monolithic hanger having an integral shock absorber attachment bracket which is made as an aluminum extrusion. Finally the present invention provides a unique method for making an aluminum suspension subframe.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A trailer suspension subframe comprising:
    at least two beams each comprising a web portion positioned generally parallel to the web portion of an adjacent beam and a flange portion generally formed perpendicular to each web portion;
    a plurality of ribs attached to the at least two beams and positioned extending transversely between and generally perpendicular to the at least two beams;
    at least one hanger attached to each beam wherein each hanger comprises a monolithic body formed from extruded aluminum having a swing arm attachment portion and an integrally formed shock absorber bracket;
    wherein the trailer suspension subframe is made of aluminum;
    wherein the flange portion of each beam comprises at least one air spring support area; and
    at least one generally U shaped aluminum channel having a central portion and a pair of leg portions extending from the central portion, wherein each leg portion of the U shaped channel is attached to one of said plurality of ribs, and wherein the U shaped channel is attached to the at least two beams.

2. The trailer suspension subframe of claim 1, wherein each hanger is attached to one of said at least one U shaped channels.

* * * * *